Aug. 25, 1931.  M. M. KULUS  1,820,230
AUTOMATIC PHOTOGRAPHIC APPARATUS
Filed Oct. 11, 1927   8 Sheets-Sheet 1

Aug. 25, 1931.  M. M. KULUS  1,820,230
AUTOMATIC PHOTOGRAPHIC APPARATUS
Filed Oct. 11, 1927   8 Sheets-Sheet 2

Matthew Marvin Kulus  INVENTOR
BY
his ATTORNEY

Aug. 25, 1931.  M. M. KULUS  1,820,230
AUTOMATIC PHOTOGRAPHIC APPARATUS
Filed Oct. 11, 1927   8 Sheets-Sheet 8

INVENTOR
Matthew Marvin Kulus
BY
ATTORNEY

Patented Aug. 25, 1931

1,820,230

UNITED STATES PATENT OFFICE

MATTHEW MARRIN KULUS, OF NEW YORK, N. Y., ASSIGNOR TO PHOTOSELF MACHINE CORPORATION, OF JAMAICA, NEW YORK, A CORPORATION OF NEW YORK

AUTOMATIC PHOTOGRAPHIC APPARATUS

Application filed October 11, 1927. Serial No. 225,435.

My invention relates to coin-controlled devices and in particular to a coin-controlled automatic photographic apparatus which is so constructed that upon the insertion of a coin, it will automatically bring in position for exposure a sensitized surface, expose the same, develop the picture in a developing tank and deliver the finished picture, all within less than a minute's time. The machine embodying my invention is durably and compactly constructed, has comparatively few parts, is simple in operation and "foolproof" and occupies but a small space.

For a full understanding of my invention, I refer to the annexed drawings, in which I have shown, by way of illustration, an automatic photographic apparatus built in accordance with my invention.

In these drawings.

Figure 1:
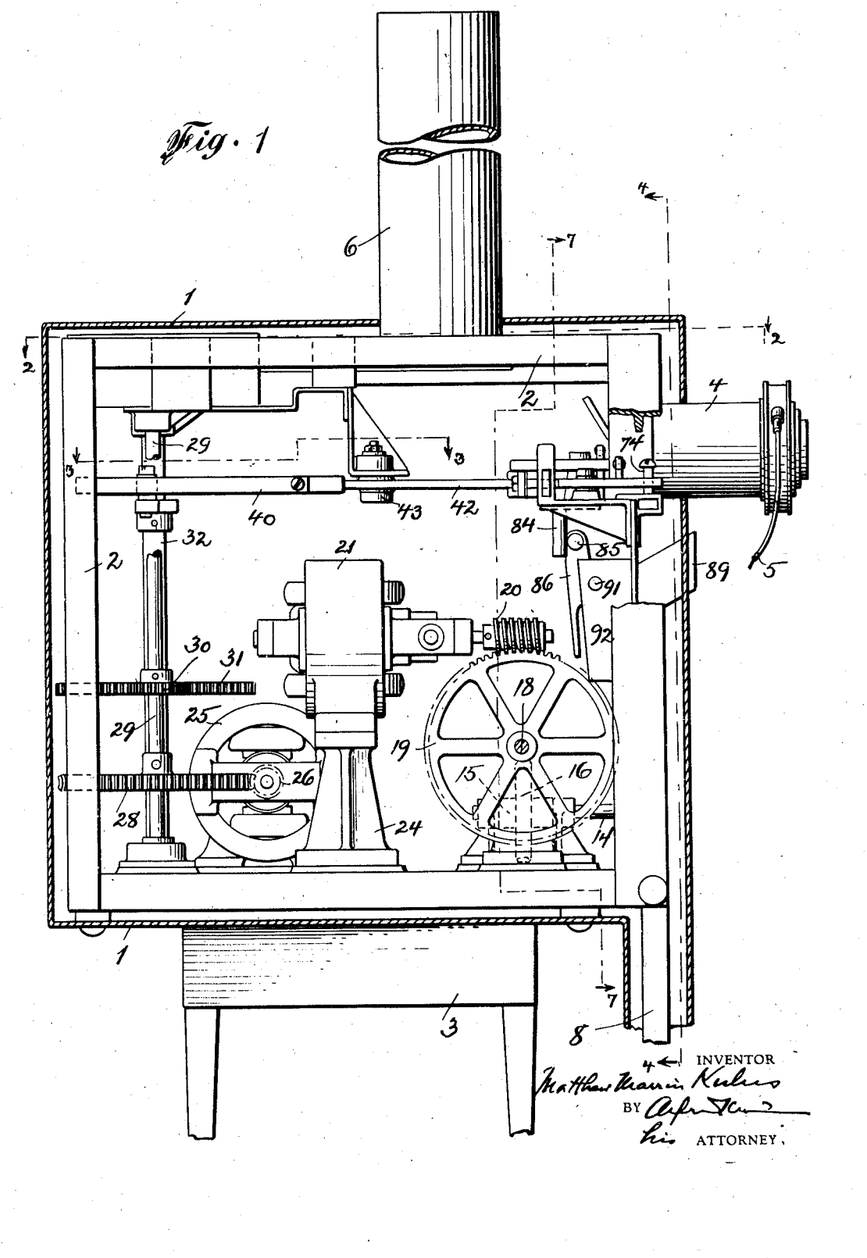
Fig. 1 is a sectional view showing the operating parts as viewed from the side, a portion of the inner frame being broken away.

The operating parts of the apparatus are enclosed in a box-like casing indicated at 1 and are supported by a frame 2, preferably of metal. At 3 in Fig. 1 is shown a table on which the apparatus is placed. The tube 4 forwardly projecting from casing 1 contains the lens or lenses and the shutter (not shown), which latter is operated in well-known manner through a Bowden wire shown at 5.

Figures 10, 11:
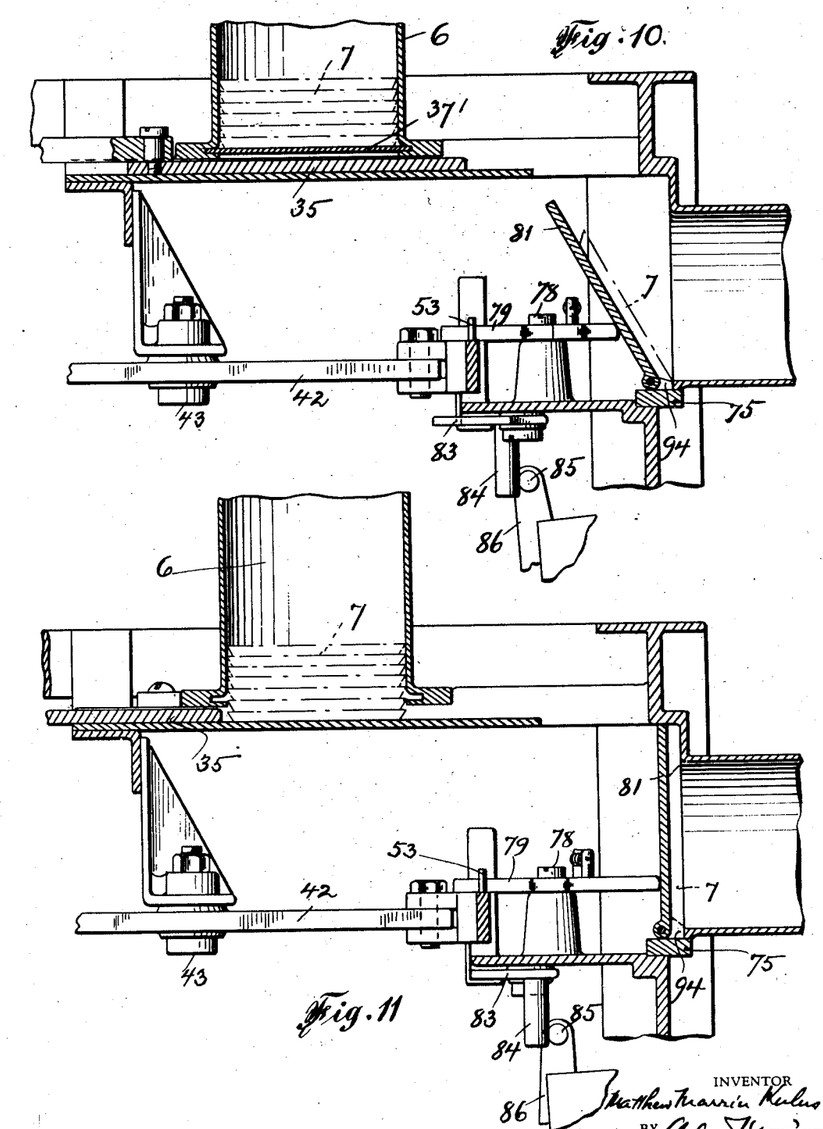
Fig. 10 is a detail sectional view along line 10—10 in Fig. 2, drawn to a larger scale.
Fig. 11 is a similar section as Fig. 10, showing the parts in a different position. Finally.

Projecting upwardly from the casing, like a chimney, is the magazine 6 for the sensitized plates shown in outline at 7 in Figs. 10 and 11. As I use disk-shaped plates, the magazine 6 is of tubular shape and is long enough to hold about 100 disks, which have a small mirror on one side and a sensitized surface on the opposite side, the mirror and sensitized surface being held together by an annular narrow metal frame.

At the front of the apparatus is provided the developing tank shown at 8 which is of semi-circular contour and is frictionally held in the frame by means of the screws 9 and 10, so that it can be readily removed, if desired. The developing liquid which is indicated at 11 in Fig. 4 can be drawn off through the petcock shown at 12.

Into the developing tank dip long blades 13 which are secured to a shaft 14 rotatably journalled in a bearing indicated in Fig. 1 at 15 and carrying a worm-wheel indicated in said figure at 16. Worm-wheel 16 is continually rotated by means of a worm 17 (Fig. 7) secured to, or formed on, a rotatable shaft 18, carrying at its one end a worm-wheel 19 in mesh with a worm 20 secured to, or formed on, the shaft of the electric motor 21 shown in Fig. 1. The shaft 18 is rotatably journalled in standards 22 and 23 (Fig. 7) which are provided with suitable bearings. The electric motor 21 rests on a support shown at 24 in Fig. 1.

A second electric motor is shown at 25 (Figs. 1 and 2) which, by means of a worm 26, secured to, or formed on, the motor shaft 27, and a worm-wheel 28 in mesh with worm 26 rotates an upright shaft 29. The latter also carries a small toothed wheel 30 which meshes with a larger toothed wheel 31 (Figs. 1 and 2) secured to an upright shaft 32.

At its upper end, shaft 32 has secured to it an arm 33 (Fig. 2) which, by means of a link 34, is pivotally connected to a flat slide 35 adapted to slide back and forth between guide-rails 36 and 37 below the discharge opening of magazine 6, which discharge opening is normally closed by a slide-plate 37' (Fig. 10).

The shaft 32 also carries an arm 38 (Figs.

2 and 3) having a roller 39, which bears on the inside of a loop-shaped member 40, detachably secured by a screw-bolt 41 to a bar 42 fulcrumed intermediate its ends at 43, and pivotally connected at 44 to a lug 45 secured to a slide-member 46 adapted to be shifted longitudinally over a flat support 47, being guided while shifted at its two ends in sleeves 48 and 49 (Figs. 8 and 9) formed on support 47. At 50, slide-member 46 is slotted, and a latch 51 projects into said slot, being held therein by a leaf-spring 52, bearing against the latch.

Figure 8:
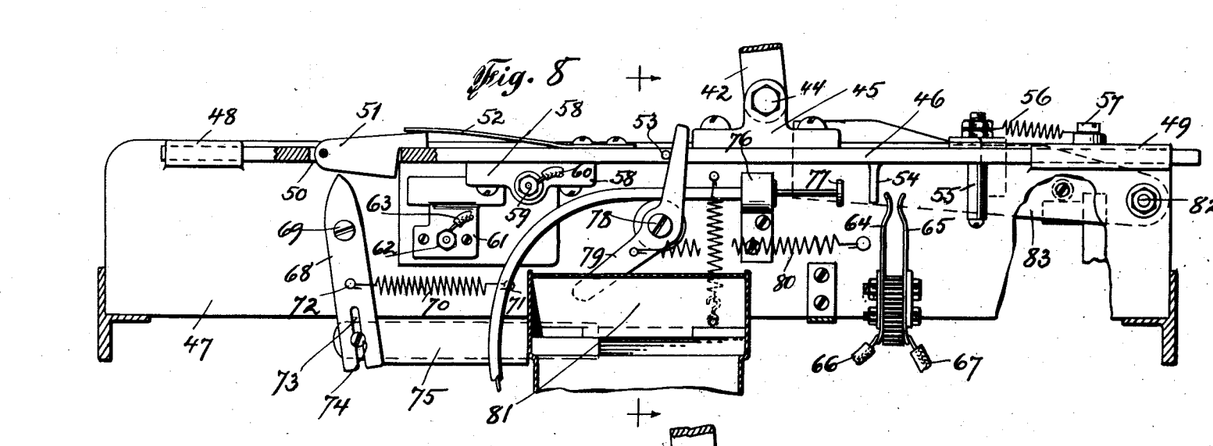
Figs. 8 and 9 are horizontal sections, drawn to a larger scale, along line 8—8 in Fig. 7, showing the parts in different positions.
Figure 9:
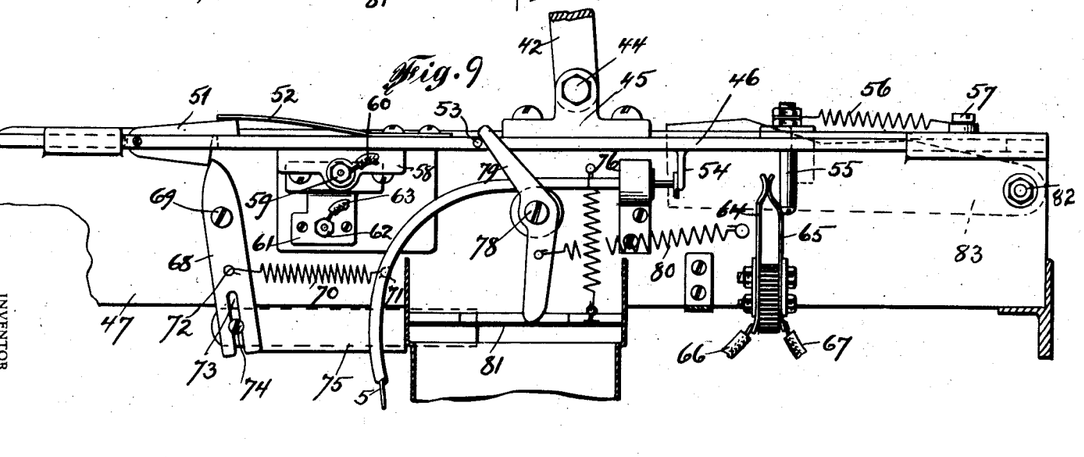

Further, the slide-member 46 is provided with an upwardly projecting pin 53, a forwardly projecting lug 54 and a forwardly projecting bolt 55, all these parts being clearly shown in Figs. 8 and 9. To the rearwardly projecting end of bolt 55 is attached one end of a tension spring 56, the other end of which is secured by a screw 57, or the like, to the support 47, so as to prevent the slide-member 46 from leaving the position shown in Fig. 8, each time it is by means of the bar 42 returned to the position shown in Fig. 8. At 58 is shown a contact block carried by the slide-member 46, said contact block carrying a binding screw 59 for securing thereto a wire 60, whereas to the support 47 is secured a contact-member 61 being insulated from said support and provided with a binding screw 62 for securing thereto a wire 63.

To the support 47 are also secured, being insulated therefrom, two contact blades 64 and 65 to which are connected the electric wires 66 and 67 respectively, whereas at 68 is shown a pawl-arm pivoted to support 47 at 69 and adapted to cooperate with latch 51 mentioned above. A tension spring 70 secured at one end to a pin 71 carried by the support 47 is fastened with its other end to a pin 72 carried by the pawl-arm 68. At its forwardly projecting end, the pawl-arm 68 is provided with a slot 73 into which slot enters a pin 74 carried by a slide 75, which as will be hereinafter described, controls the positioning of the sensitized plates in front of the lenses releasing them after the exposure so as to permit them to reach the developing tank above referred to.

At 76 is secured to support 47 a small bracket holding the Bowden wire 5 whereby the shutter is controlled. The knob 77 of the wire lies in the path of the lug 54 carried by the slide-member 46 so as to be operated thereby when the slide-member is moved to the position shown in Fig. 9.

Figures 4, 5, 6:
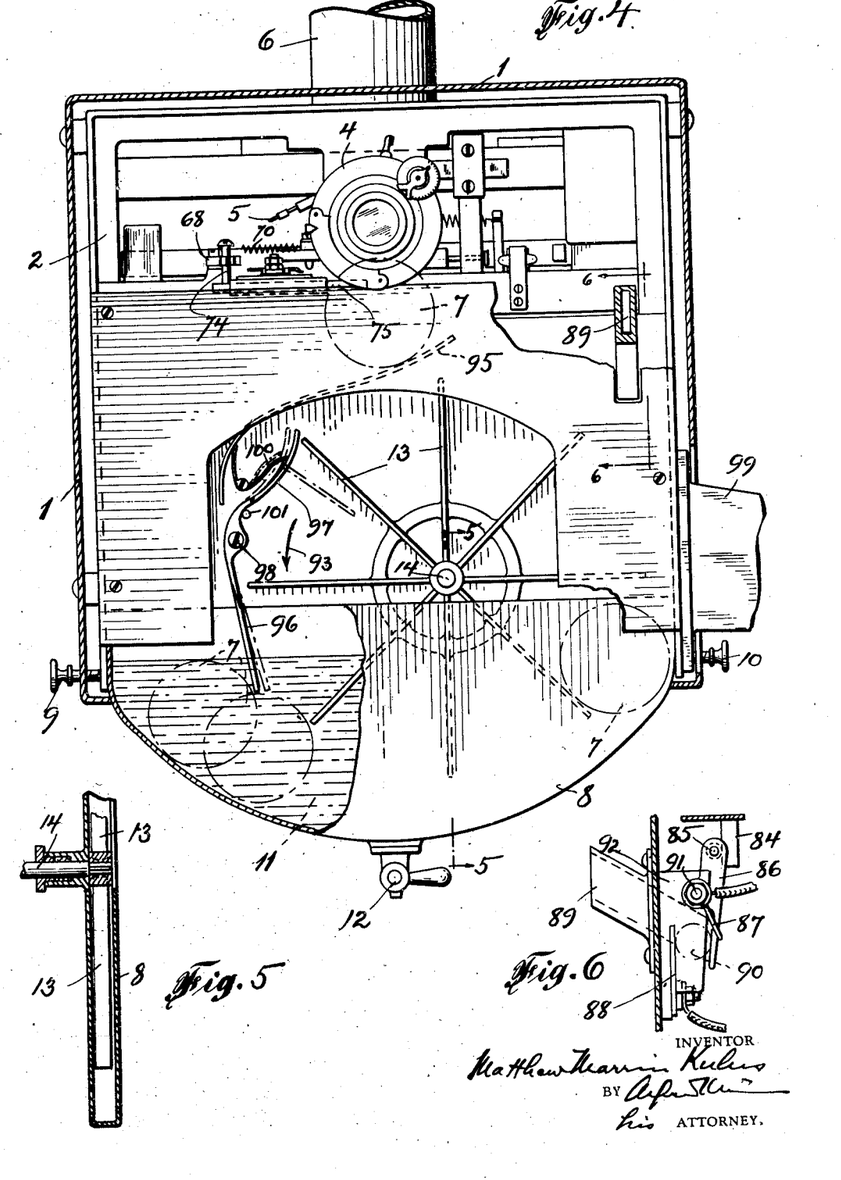
Fig. 4 is a sectional view showing the operating parts as viewed from the front, the section being along line 4—4 in Fig. 1.
Figs. 5 and 6 show certain details, Fig. 5 being a section along line 5—5 in Fig. 4.

At 78 is fulcrumed on the support 47 a small bell-crank lever 79 to the forward arm of which is attached the end of a tension spring 80 fastened with its other end to support 47 and tending to rock the bell-crank lever 79 into the position shown in Fig. 9, whereas the said bell-crank lever is normally held by the pin 53 against the tension of said spring 80 in its inoperative position shown in Fig. 8. The forward arm of bell-crank lever 79 bears against a hinged plate 81 more clearly shown in Figs. 10 and 11, which in the position of the bell-crank lever 79 as shown assumes the inclined position shown in Fig. 10 permitting a sensitized disk 7 to be moved from the magazine 6 onto the hinged plate 81 about ready to be exposed. Fig. 11 shows the hinged plate 81 shut, in which position the sensitized disk 7 is ready to be exposed. Finally, there is shown pivoted to support 47 at 82, on the underside of the support, a cam-plate 83, the purpose of which plate will be set forth further down. Said plate has depending therefrom a pin 84 clearly shown in Figs. 10 and 11, which pin is adapted to engage a pin 85 carried by an arm 86 (Figs. 1 and 7), against which bears the end of a spring 87 shown in Fig. 7 tending to move the arm toward a coin-guide 88 provided below the coin drop shown at 89 in Figs. 1 and 6. In Fig. 6 a coin is indicated at 90. The arm 86 is shown in Figs. 1 and 6 fulcrumed at 91 to a bracket 92 forming part of the coin-chute. A coin dropped through the coin-drop 89 into the coin-chute is therefore held in the position shown in Fig. 6, until it is released by the arm 86 when being rocked about its fulcrum 91 by the cam-plate 83 through the pins 84 and 85.

Figure 7:
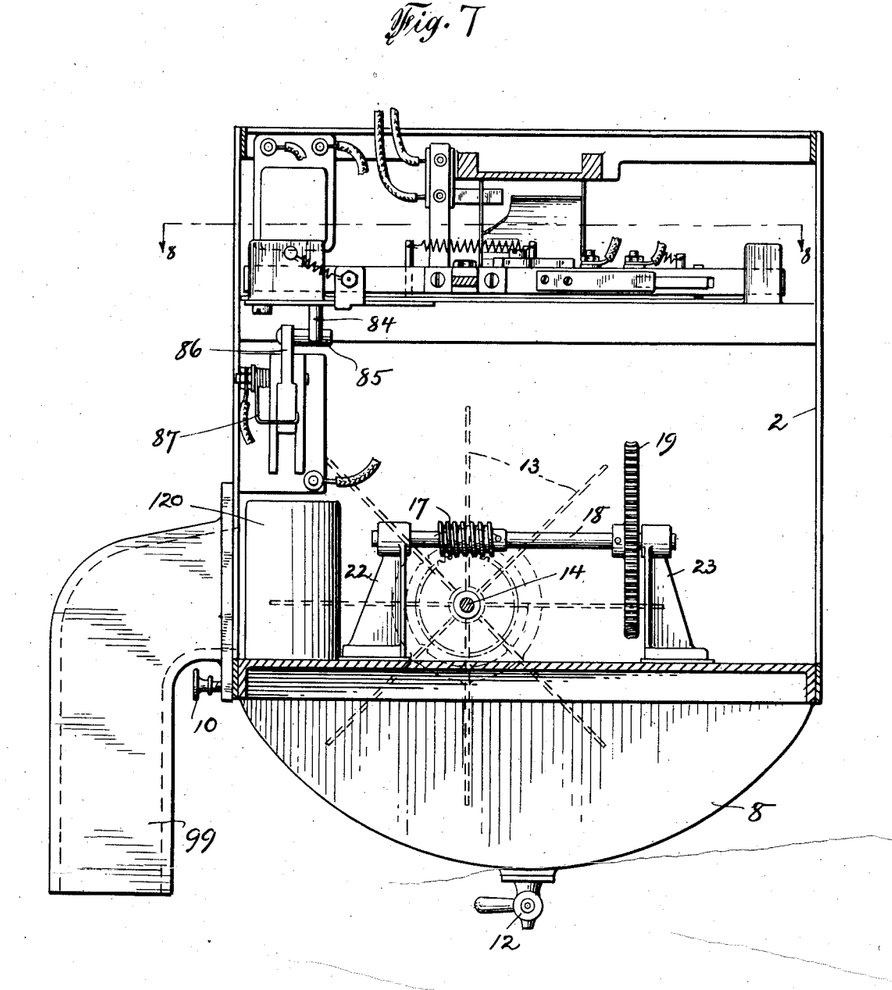
Fig. 7 is a vertical section through the apparatus viewed from the rear.

To prevent the sensitized disks 7 from becoming jammed between the continuously revolving blades 13 (Fig. 4), as they rotate in the direction of the arrow shown at 93, I provide below the discharge opening 94 (Fig. 11) a curved plate 95 (Fig. 4) which guides the disks 7 toward the left in Fig. 4 so that each disk will be dropped down into the developing tank 8 behind the arm 96 of a two-arm lever 96, 97 fulcrumed at 98 to be temporarily held by said arm 96, until released thereby, when the disk will enter between two blades 13 to be moved along the curved bottom of the semi-circular developing tank 8, until at the other side it is raised by one of the blades 13 out of the liquid in the tank. At 99 in Fig. 4 is shown a discharge chute, which, as shown in Fig. 7 is downwardly curved so that the disks will by gravity drop out onto a table or into a receiver, not shown.

As shown in Fig. 4, the two-arm lever 96, 97 controlling the movement of the sensitized disks is normally held by a light spring 100 in the position shown in Fig. 4 in full lines, in which position the arm 97 bears against a stop 101. The arm is curved outwards to such an extent that a blade 13 as it passes the arm 97 will rock the lever 96, 97 about its fulcrum sufficiently for the arm 96 to release a disk 7.

The discharge opening 94 (Fig. 11) is controlled by the slide 75 previously referred to and shown in Figs. 8 and 9, which slide, by means of the pawl-arm 68 is, at the proper time, moved away, toward the left in Figs. 4, 8 and 9, thereby releasing a disk 7, after it has been exposed.

Figure 2:
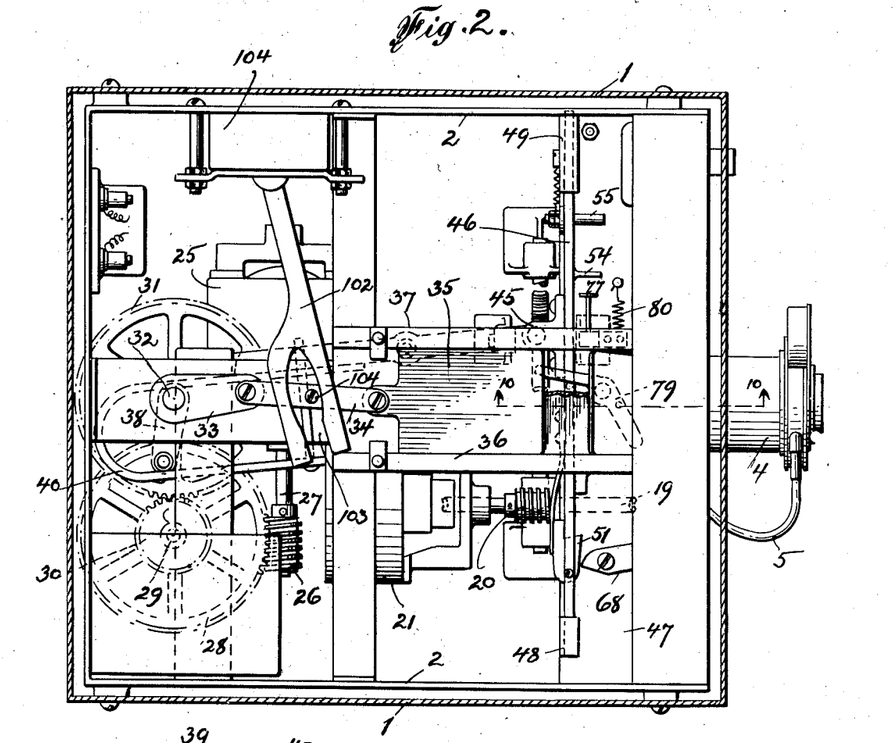
Fig. 2 is a sectional view showing the operating parts as seen from the top, the section being taken along line 2—2 in Fig. 1.
Figure 3:
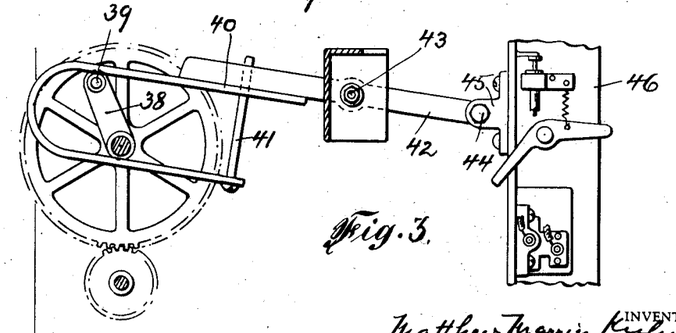
Fig. 3 is a detail sectional view along line 3—3 in Fig. 1.

In Fig. 2 is shown at 102 a pivoted arm provided at its forward end with a cam-slot 103 into which enters a pin 104 carried by the previously mentioned link 34, so that upon the movement of the latter, the arm 102 will be moved either to the left or to the right in Fig. 2. The arm 102 controls a switch enclosed in a box shown at 104 in Fig. 2.

It now remains to describe the various switches and electric circuits used in my photographic apparatus, two switches having already been mentioned in connection with the slide-member 46 and the associated parts.

Figure 15:
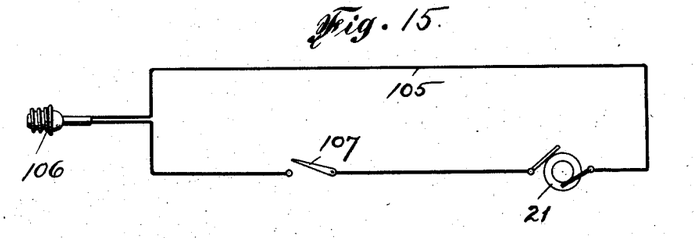

In Fig. 15 is shown the electric circuit 105 of the motor 21, which rotates the blades 13 through the developing tank 8. By means of a plug shown at 106 in Fig. 15, the motor 21 can be connected to any electric lamp-socket, and when the switch shown at 107 is closed, the motor 21 is set in operation, and the blades 13 will remain revolving, as long as the motor-circuit 105 remains closed.

Figure 14:
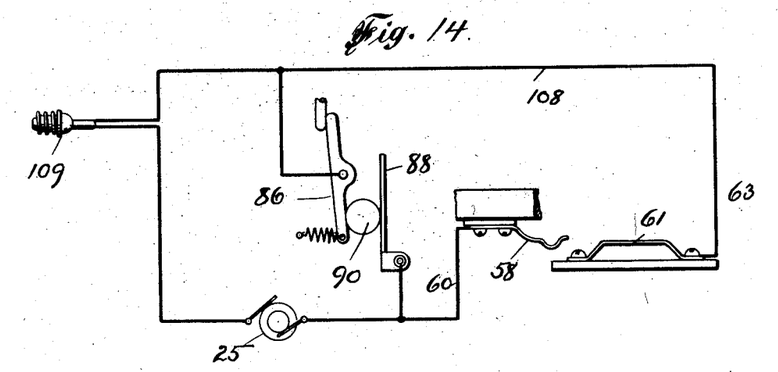

In Fig. 14 is shown the circuit 108 of the other electric motor 25 which, by means of a plug shown at 109, may likewise be connected to any source of electric energy. The circuit 108 is closed by the insertion of a coin (90) and the motor 25 immediately starts rotating shaft 32, causing the above mentioned slide-member 46 to be shifted longitudinally. Thereby contact is produced between the contact members 58 and 61, so that the circuit of the motor 25 will be kept closed, even after the coin (90) has dropped down from its position between arm 86 and the coin-guide 88.

Figures 12, 13:
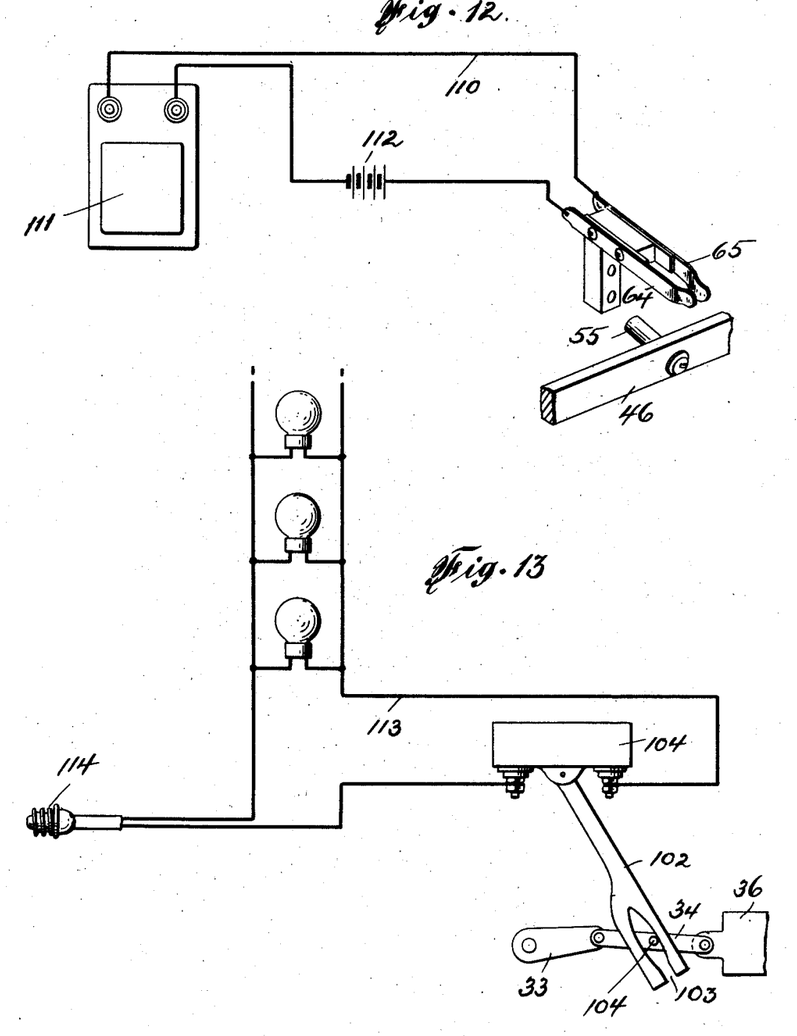
Figs. 12–16 are electric circuit diagrams.

At 64 and 65 in Fig. 12 are shown the two contact blades shown also in Figs. 8 and 9 which, by means of the pin 55 carried by the slide member 46 are brought into contact with each other, thereby closing a local battery circuit 110 including a buzzer shown in Fig. 12 at 111. The battery is shown at 112.

In Fig. 13 is shown the lamp circuit 113 including the lamps for illuminating the face of the person whose picture is being taken. Three lamps are shown in Fig. 12, but a single lamp of sufficient candle-power is, of course sufficient. This lamp-circuit is controlled by a switch enclosed in the box 104 (see also Fig. 2), which switch is actuated by the pivoted arm 102 described above. At 114 is shown a plug, whereby the lamp-circuit 113 may be connected to any desired source of electric energy.

Figure 16:
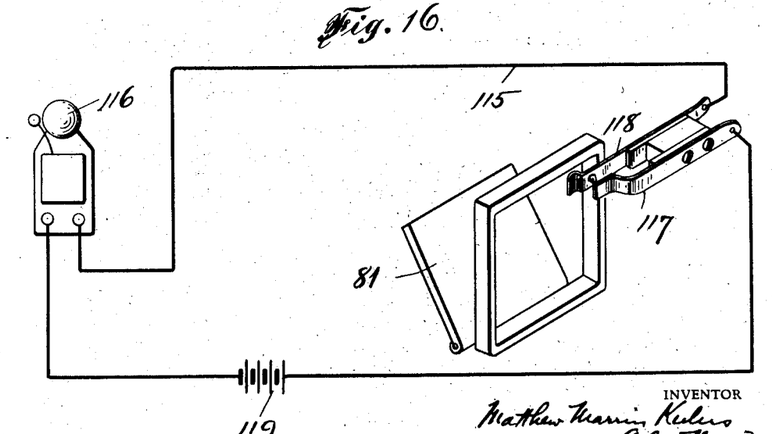

Finally, Fig. 16 shows a separate battery circuit 115 including an audible signal, such as a bell, indicated at 116 which bell is rung, when the magazine containing the sensitized disks is empty and no disks are pushed by the slide 35 onto the hinged plate 81. In that case, the plate 81 causes the contact of two contact blades indicated in Fig. 16 at 117 and 118 which close the signal circuit 115 and cause the bell 116 to ring. The battery of this circuit is shown at 119 in Fig. 16. The operation of the apparatus hardly needs any description now.

The person who desires to have his or her picture taken by the apparatus is seated in front of the same at a suitable distance away therefrom. The attendant, by inserting the plug 106 of the motor circuit 105 (Fig. 15) to a lamp socket sets the blades 13 revolving, and the other two circuits shown in Figs. 13 and 14 are similarly connected. When a coin is now inserted into the apparatus, the second-electric motor 25 is set in motion and by means of the above described parts, shaft 29, shaft 32, arm 38, loop 40 and bar 42, the slide-member 46 is shifted longitudinally, until the pawl-arm 68 is caught by the latch 51 as shown in Fig. 9. Simultaneously with this lengthwise movement of slide-member 46, the slide 35 (Fig. 2), by means of the arm 33 on shaft 32 and link 34 has been moved toward the right in Fig. 2 pushing along the lower-most disk (7) in the magazine 6. This disk drops onto the hinged plate 81 which, by means of the bell-crank lever 79 (Fig. 9) is swung forward so as to bring the disk 7 into the proper position relative to the camera lens or lenses. Meanwhile, the projection 54 on slide-member 46 has reached the knob 77 at the end of the Bowden wire 5 and as the switch contained in the box 104 (Figs. 2 and 13) is operated by the slotted arm 102 to close the lamp circuit, the shutter of the camera is opened by means of the Bowden wire and the picture is taken. Immediately thereafter, the slide-member 46 is returned from its position shown in Fig. 9 to its original position shown in Fig. 8, and during this movement, there is withdrawn, by means of the pawl arm 68 the slide 75, from beneath the exposed disk 7, which now drops onto the curved plate 95 shown in Fig. 4 rolling behind the arm 96 of the two-arm lever 96, 97. By contact of one of the blades 13 with arm 97 the lever 96, 97 is rocked about its pivot thus releasing the disk 7 which thereupon is moved by one of the blades along the curved bottom of tank 8 through the developing liquid (11), until it reaches the position shown in Fig. 4, in which position it is shown being lifted out of the tank 8 to be delivered through the discharge chute 99 onto a table or into a suitable receptable. The apparatus is ready for the next exposure, as soon as an exposed disk has been released.

Where the apparatus is used in places, where many people thus have their picture taken, the two motor-circuits, and the lamp circuit of course, remain connected, so that the apparatus will be ready for operation all the time.

Before the operation of the apparatus is started, the attendant withdraws by hand the slide 37' (Fig. 10) so as to permit the sensitized disks stored in the magazine 6 to be pushed by the flat slide 35 onto the hinged plate 81.

At 120 in Fig. 7 is shown a receptacle for receiving the coins dropped at 89 into the coin-chute.

While I have described and shown an embodiment of my invention, I do not—of course—limit myself to the construction herein disclosed, as the apparatus may be modified in various respects without a departure from the essence of the invention.

I claim:

1. In automatic photographic apparatus, the combination with a closed casing, a frame therein and a photographic lens and shutter carried thereby, of a magazine for a plurality of single sensitized elements, means for successively delivering said elements from said magazine to exposure position, means for retaining said sensitized elements in position while being exposed, means for releasing the exposed sensitized element, a developing tank, a revolving member for moving the exposed sensitized element through said tank and then delivering it from said casing, a source of electric energy, an electric circuit, means for closing said circuit, an electric motor in said circuit, a slide-member shifted by said electric motor upon the closing of said circuit to thereby actuate said retaining and said releasing means and the shutter.

2. In automatic photographic apparatus, the combination with a closed casing, a frame therein and a photographic lens and shutter carried thereby, of means for successively moving sensitized elements into exposure position, means for releasing the exposed sensitized elements, a developing tank, means for passing the exposed sensitized elements through said tank, a slide-member, means carried by said slide member adapted to be actuated relative thereto by sliding movement thereof for controlling said moving and said releasing means and actuating said shutter, an electric circuit, means for closing said circuit, and an electric motor in said circuit for shifting said slide-member.

3. In automatic photographic apparatus, the combination with a closed casing, a frame therein and a photographic lens and shutter carried thereby, of a magazine adapted to contain a plurality of sensitized elements in said magazine to be fed by gravity, a hinged plate adapted to receive said sensitized elements for exposure and hold them in position, a means for successively delivering the sensitized elements onto said hinged plate, a means for releasing the exposed sensitized elements, a developing tank, a slide-member, means carried by said slide member adapted to be actuated relative thereto by sliding movement thereof for controlling said delivering and said releasing means and actuating said shutter, an electric circuit, means for closing said circuit, and an electric motor in said circuit for shifting said slide-member.

4. In automatic photographic apparatus, the combination with a closed casing, a frame therein and a photographic lens and shutter carried thereby, of a magazine adapted to contain a plurality of sensitized elements in said magazine to be fed by gravity, a hinged plate adapted to receive said sensitized elements for exposure and hold them in position, a means for successively delivering the sensitized elements onto said hinged plate, a means for releasing the exposed sensitized elements, a developing tank, a slide-member for controlling said delivering and said releasing means and actuating said shutter, an electric circuit, means for closing said circuit, an electric motor in said circuit for shifting said slide-member, and revolving blades adapted to receive the exposed sensitized elements to pass them through said developing tank, and means for continually revolving said blades.

5. In automatic photographic apparatus, the combination with a closed casing, a frame therein and a photographic lens and shutter carried thereby, of a magazine adapted to contain a plurality of sensitized elements in said magazine to be fed by gravity, a hinged plate adapted to receive said sensitized elements for exposure and hold them in position, a means for successively delivering the sensitized elements onto said hinged plate, a means for releasing the exposed sensitized elements, a developing tank, a slide-member for controlling said delivering and said releasing means and actuating said shutter, an electric circuit, means for closing said circuit, an electric motor in said circuit for shifting said slide-member, revolving blades adapted to receive the exposed sensitized elements to pass them through said developing tank, means for continually revolving said blades and a rocking lever cooperating with said blades and adapted to release said sensitized elements one by one to be engaged by said blades, and a guide for guiding said sensitized elements to said rocking lever.

6. In automatic photographic apparatus, the combination with a closed casing, a frame therein and a photographic lens, a lens holder and shutter carried thereby, of a magazine adapted to contain a plurality of sensitized elements in said magazine to be fed by gravity, a hinged plate adapted to receive said sensitized elements for exposure, a means for successively delivering the sensitized elements to said hinged plate, a means for closing said hinged plate against said lens holder to hold the sensitized elements in exposure position, a means for releasing the exposed sensitized elements, a developing tank, a slide-member, means carried by said slide-member adapted to be actuated relative thereto by sliding movement thereof for controlling said delivery means, said releasing means, said plate closing means and said shutter, an electric circuit, means for closing said circuit and an electric motor in said circuit for shifting said slide-member.

7. In automatic photographic apparatus, the combination with a closed casing, a frame therein and a photographic lens, a lens holder and shutter carried thereby, of a magazine adapted to contain a plurality of sensitized elements in said magazine to be fed by gravity, a hinged plate adapted to receive said sensitized elements for exposure, a means for successively delivering the sensitized elements to said hinged plate, a means for closing said hinged plate against said lens holder to hold the sensitized elements in exposure position, a means for releasing the exposed sensitized elements, a developing tank, a slide-member, means carried by said slide-member adapted to be actuated relative thereto by sliding movement thereof for controlling said delivery means, said releasing means, said plate closing means and said shutter, an electric circuit, means for closing said circuit and an electric motor in said circuit for shifting said slide-member.

8. In automatic photographic apparatus, the combination with a closed casing, a frame therein and a photographic lens, a lens holder and shutter carried thereby, of a magazine adapted to contain a plurality of sensitized elements in said magazine to be fed by gravity, a hinged plate adapted to receive said sensitized elements for exposure, a means for successively delivering the sensitized elements to said hinged plate, a means for closing said hinged plate against said lens holder to hold the sensitized elements in exposure position, a means for releasing the exposed sensitized elements, a developing tank, a slide-member, means carried by said slide-member for controlling said delivery means, said releasing means, said plate closing means and said shutter, an electric circuit, means for closing said circuit, an electric motor in said circuit for shifting said slide-member, a signal-circuit, and contacts in said circuit adapted to be engaged by said hinged plate to close said signal circuit in the absence of any sensitized elements.

9. In automatic photographic apparatus, the combination with a closed casing, a frame therein and a lens-holder and shutter supported thereby, of means for successively delivering to exposure position relative to said lens-holder single sensitized elements, means for holding the sensitized elements in exposure position, a developing tank, means for releasing the sensitized elements toward said developing tank, a single movable member for operating said delivering, holding and releasing means and said shutter, an electric motor for actuating said movable member, an electric circuit including said motor means for closing said circuit, and continually revolving means for moving the exposed sensitized elements through said developing tank and discharging them from the casing.

10. In automatic photographic apparatus a developing tank, means for taking a picture on a member having a sensitized surface and for thereafter delivering said member to said tank, and means acting positively to move said member through said tank along the bottom thereof.

11. In automatic photographic apparatus a developing tank, means for taking a picture on a member having a sensitized surface and for thereafter delivering said member to said tank, and rotatable means for moving said member through said tank.

12. In automatic photographic apparatus a developing tank, means for taking a picture on a member having a sensitized surface and for thereafter delivering said member to said tank, a rotatable shaft, and a plurality of blades radiating from said shaft any adjacent pair of which are adapted to receive said member therebetween for moving said member through said tank.

13. In automatic photographic apparatus a developing tank, means for taking a picture on a member having a sensitized surface and for thereafter delivering said member to said tank, rotatable means for moving said member through said tank, and releasable means for holding said member against engagement with said rotatable means until the latter has reached a predetermined position of rotation.

14. In automatic photographic apparatus a developing tank, means for taking a picture on a member having a sensitized surface and for thereafter delivering said member to said tank, releasable means for holding said member against engagement with said rotatable means until the latter has reached a predetermined position of rotation, and means whereby said rotatable means upon reaching a predetermined position of rotation releases said holding means.

15. In automatic photographic apparatus a developing tank, means for taking a picture on a member having a sensitized surface and for thereafter delivering said member to said tank, releasable means for holding said member against engagement with said rotatable means until the latter has reached a predetermined position of rotation, and means whereby said rotatable means upon reaching a predetermined position of rotation releases said holding means, said holding means consisting of an intermediately pivoted lever one end of which is adapted for holding engagement with said member and the other end of which is adapted to be engaged and moved by said rotatable means to effect movement of the first mentioned end thereof to release said member.

16. In automatic photographic apparatus, a hinged plate adapted to have a member with a sensitized surface delivered thereto and to be swung to dispose said member in a position for exposure, a signal, and means adapted to be actuated by swinging movement of said hinged plate in the absence of a sensitized member therefrom to cause operation of said signal.

17. In automatic photographic apparatus, a hinged plate adapted to have a member with a sensitized surface delivered thereto and to be swung to dispose said member in a position for exposure, a signal, and means adapted to be actuated by swinging movement of said hinged plate in the absence of a sensitized member therefrom to cause operation of said signal, said last named means comprising an intermediately pivoted lever connected at one end with said slide member, a reciprocal member, and a dog carried by said reciprocal member for cooperation with the other end of said lever.

In testimony whereof I affix my signature.

MATTHEW MARRIN KULUS.